United States Patent [19]

Lisson et al.

[11] Patent Number: 5,017,011
[45] Date of Patent: May 21, 1991

[54] ASSEMBLY AND METHOD FOR MONITORING THE ALIGNMENT OF A WORKPIECE

[75] Inventors: Jerold B. Lisson, Henrietta; Richard A. Stark, Rochester, both of N.Y.

[73] Assignee: Eastman Kodak Company, Rochester, N.Y.

[21] Appl. No.: 218,404

[22] Filed: Jul. 12, 1988

Related U.S. Application Data

[63] Continuation-in-part of Ser. No. 108,254, Oct. 13, 1987, Pat. No. 4,846,575, and a continuation-in-part of Ser. No. 212,814, Jun. 29, 1988, Pat. No. 4,887,905.

[51] Int. Cl.$^5$ .............................................. G01B 9/02
[52] U.S. Cl. .................................................... 356/363
[58] Field of Search ........................ 356/363, 152, 153

[56] References Cited

U.S. PATENT DOCUMENTS 3,729,260 4/1973 Walsh .................................. 356/363
3,844,660 10/1974 Hunter ........................... 356/363 X Primary Examiner—Davis L. Willis
Assistant Examiner—Matthew W. Koren

[57] ABSTRACT

An assembly and method for monitoring the alignment of a workpiece with respect to a reference. The assembly and method employ an element which preferably comprises a capability for optical phase conjugation. Advantage which can result from the use of the element include enhanced sensitivity to alignment variations for both large and very small angle deviations from the reference.

3 Claims, 4 Drawing Sheets

ASSEMBLY AND METHOD FOR MONITORING THE ALIGNMENT OF A WORKPIECE

CROSS-REFERENCE TO RELATED APPLICATIONS

This application is a continuation-in-part of a copending and commonly assigned patent application Ser. No. 07/108,254, filed Oct. 13, 1987 and entitled "Device and Method For Monitoring Alignment Utilizing Phase Conjugation", now U.S. Patent No. 4,846,575 and a continuation-in-part of a copending and commonly assigned patent application Ser. No. 07/212814, filed June 29, 1988 and entitled "Assembly and Method For Monitoring The Alignment Of A Workpiece" now U.S. Pat. No. 4,887,905. The entire disclosure of those applications is incorporated by reference herein.

BACKGROUND OF THE INVENTION

1. Field of the Invention

This invention relates to an assembly and method for monitoring the alignment of a workpiece.

2. Introduction to the Invention

A number of methods and devices have been used (or proposed for use) for monitoring the alignment of a workpiece with respect to a reference. A particularly important advance in this art is realized in the application referenced above. This application discloses a device that preferably employs a relatively recently discovered class of materials known as phase conjugators. Phase conjugate materials can provide reflection of radiation along an incident path. The application discloses that the phase conjugate materials can be usefully employed with other elements to the end of providing an advanced and novel monitoring device. The advantages provided by this device include sensitivity to alignment variations for both large and small angle deviations from the reference, great immunity to possible alignment perturbations in the monitoring device itself, and a capability of permitting dynamic corrections to misalignment conditions.

SUMMARY OF THE INVENTION

We have now discovered that yet further advantages can be obtained with this device, as modified in accordance with the present invention. To this end, we have now discovered an improved method and assembly for alignment monitoring, by employing in conjunction with other elements recited below, a means for applying an electrical signal to an element means, preferably comprising a phase conjugate material, to the end of generating a known phase shift in the radiation reflected by the element means. We have found that advantages which can result from this modification include improved sensitivity to alignment variations for very small angle deviations of the workpiece from the reference. For example, we can now accurately monitor angle variations of at least three to four orders of magnitude smaller than without the modification. Other advantages include great immunity to possible alignment perturbations in the monitoring assembly itself, and an enhanced capability of permitting dynamic corrections to misalignment conditions.

Accordingly, in its first aspect, this invention provides an assembly utilizing radiation for monitoring alignment of a workpiece, the assembly comprising:

(a) first element means for reflecting at least a portion of radiation incident thereupon at a first incident angle, said first element means capable of reflecting the radiation at a first reflection angle different from said first incident angle when the incident angle is not substantially normal to the reflection angle;

(b) second element means for reflecting at least a portion of radiation incident thereupon at a second incident angle, said second element means reflecting the radiation at a second reflection angle substantially equal to said second incident angle;

(c) means for applying an electrical signal to the second element means for generating a known phase shift in the radiation reflected at the second reflection angle; and (d) detector means for receiving the radiation reflected from said first element means and the radiation reflected from said second element means, and generating at least one signal indicative of the alignment of the workpiece with respect to a reference.

As mentioned above, the present invention is particularly usefully employed when it is desired to accurately monitor the workpiece for very small angle deviations from the reference. The assembly as defined provides an enhanced sensitivity to this end in the following way. First consider the case when the angle deviation is $\phi$ degrees, and the known phase shift in the radiation reflected at the second reflection angle is substantially zero. The detector means, as defined, receives the radiation reflected from the first element means, and the radiation reflected from the second element means (with the known phase shift being substantially zero). As shown in FIG. 1A, the detector means is responsive to a resulting interferometric pattern produced by the combined reflected radiation. In particular, the FIG. 1A interferometric pattern is a spatial domain representation, where waveform peaks in the interferometric pattern are separated by a distance $\Delta x$. It is the function of the detector means, having a given spatial extent x, to distinguish the waveform peaks, one from another.

Now, the angle deviation $\phi$ is related to the distance $\Delta x$ by the equation $\phi \alpha\ 1/\Delta x$. It is apparent from the equation that appropriately small angle deviations $\phi_{small}$, may cause $\Delta x$ to become unacceptably large relative to the detector means spatial extent. That is, as shown in the FIG. 1B spatial domain representation, $\phi_{small}$ can prevent the detector means from acquiring a full period or one full cycle's worth of the interferometric pattern. This result may prevent the detector means from realizing the function of distinguishing waveform peaks.

It is at this point that the present invention can directly address the indicated problem, by applying the electrical signal to the second element means, thus generating the known phase shift in the radiation reflected at the second reflection angle. This action, as manifest "downstream" in the detector means, can have the effect of providing a temporal domain modulation of the FIG. 1B spatial domain waveform, in accordance with the known phase shift. This temporal modulation, in turn, can be detected by the detector means. In other words, this "temporal modulation" action, independent of the equation $\phi \alpha\ 1/\Delta x$, enables a detector means having a given spatial extent, to accommodate much smaller angle deviations ($\phi_{small}$) than it would be able to without the temporal modulation action induced by the known phase shift.

We now turn to preferred aspects of the assembly of the invention.

Preferably, the first element means comprises a linear medium, for example, a conventional plano mirror.

The second element means may comprise, for example, a structure comprising a conventional mirror in operative association with a corner cube retro-reflector.

Preferably, the second element means comprises means for phase conjugation of the radiation incident thereupon. It is preferred that the means for phase conjugation comprises a nonlinear medium, for example, a crystal of barium titanate ($BaTiO_3$). Devices that provide means for phase conjugation and that are suitable for use in this invention are well-known; reference may be made for example to U.S. Pat. No. 4,529,273, Applied Physics Letter 49 (60), Oct. 20, 1986 and references therein, and SPIE Vol. 739 Phase Conjugation; Beam Combining and Diagnostics (1987) and references therein. The disclosures of these references are incorporated by reference herein.

Devices that provide means for phase conjugation have a first capability of reflecting radiation back on the incident path, as asserted above. The devices also have a second capability, namely, to correct an aberration in the incident radiation, such as for transmitting an imaging radiation beam or source of radiation through a distorting medium. In the present invention, the second element means comprising a phase conjugate material can be usefully exploited to take advantage of both the first and second capabilities. The present invention takes advantage of the first capability by using the reflected radiation on the incident path as an invariant reference, immune, for example, to any misalignments in the assembly itself. The present invention takes advantage of the second capability by, for example, correcting aberrations induced by the medium traversed by the radiation between its origin and the workpiece. Thus the phase conjugate radiation or invariant reference is not deviated by optical phase distorting media between the workpiece and the detector means.

Preferably, the first element means and the second element means are in operative association. The operative association can be realized, for example, by separate first and second element means; or, single structure that provides both functions of the first and second element means. This defines a phase-conjugate Fizeau interferometer. In particular, it is preferred that a reflecting surface of the first element means can be attached to the second element means. Preferably, the second element means, either attached to, or not attached to the first element means, is capable of being connected to the workpiece, or itself comprises at least a portion of the workpiece.

The means for applying an electrical signal to the second element means may comprise any electrical signal that may be expressed in a deterministic or a stochastic form. For example, the electrical signal may be one that can be expressed in a Fourier transform domain, and can be either a non-periodic or periodic signal. Preferred periodic signals include e.g., sawtooth, triangular, square or sinusoidal waveforms.

The means for applying an electrical signal to the second element means may comprise a modulation signal defined by the equation $$V_s = C + A(t) \sin(w(t) + \beta(t) + k),$$

where $V_s$ is a voltage function;
C is a constant voltage;
A(t) is an amplitude function of time;
w(t) is a frequency function of time;
$\beta(t)$ is a phase function of time;
t is a variable time; and
k is a constant.

Preferably, the amplitude A(t) is a constant that can be selected from a range of 1 volt to 10K volts and in particular, a range of 10 volts to 1,000 volts. When the amplitude is not a constant, it preferably comprises a sinusoid.

Preferably, the frequency w(t) is a constant that can be selected from a range of 50 hz to $10^7$ hz.

Preferably, the phase $\beta(t)$ is an arbitrary constant.

The modulation signal $V_s$ may be modulated by at least one of the techniques of amplitude modulation, phase modulation, and frequency modulation.

The detector means preferably detects an interferometric pattern produced in combination by the reflected radiation from the first element means, and the reflected radiation from the second element means. Preferably, the detector means comprises detector array means for detecting a characteristic of the reflected radiation from the first element means, and a characteristic of the reflected radiation from the second element means. A preferred characteristic may be voltage or current, as provided, for example, by a photo-diode array means.

It will be understood to those skilled in the art, that a particular, selected electrical signal requires an appropriate and complementary detector means. For example, in the Detailed Description of the Invention disclosed below, the electrical signal has a sawtooth waveform, and an appropriate detector means for this waveform is shown in FIG. 4.

The assembly as defined preferably further comprises means for directing the reflected radiation from the first element means and reflected radiation from the second element means, to the detector array means. Conventional beam splitters and lenses can be employed to this end.

The assembly preferably further comprises a source of radiation, utilized as defined above. Preferably, the source of radiation comprises a source of electromagnetic radiation in the optical region of the spectrum, and preferably comprises a source of light of such nature to permit its phase conjugation by the second element means. A suitable source of radiation comprises a laser having an appropriate energy output, such as a helium-neon laser operating at a wavelength of 6328 Angstroms. Other preferred sources of radiation comprise acoustical energy, infrared energy, or microwave radiation.

In its second aspect, the invention provides a method utilizing radiation for monitoring the alignment of a workpiece, the method comprising the steps of:
(a) positioning an assembly for monitoring the alignment of the workpiece, the assembly comprising:
  (i) first element means for reflecting at least a portion of radiation incident thereupon at a first incident angle, said first element means capable of reflecting the radiation at a first reflection angle different from said first incident angle when the incident angle is not substantially normal to the reflection angle;
  (ii) second element means for reflecting at least a portion of radiation incident thereupon at a second incident angle, said second element means reflecting the radiation at a second reflection angle substantially equal to said second incident angle;

(iii) means for applying an electrical signal to the second element means for generating a known phase shift in the radiation reflected at the second reflection angle; and (iv) detector means for receiving the radiation reflected from said first element means and the radiation reflected from said second element means;

(b) generating radiation for utilization by the assembly as defined; and (c) generating the known phase shift in the radiation reflected at the second reflection angle, for producing in the detector means at least one signal indicative of the alignment of the workpiece with respect to a reference.

The advantages of the method of the invention include the fact that it can be employed for monitoring the alignment of the workpiece with respect to six degrees of freedom. Accordingly, the method may be employed inter alia:

(1) for monitoring the alignment of the workpiece with respect to a tilt error from the reference;

(2) for monitoring the alignment of the workpiece with respect to a centering error; or (3) for monitoring the alignment of the workpiece with respect to an axial spacing error.

BRIEF DESCRIPTION OF THE DRAWINGS

The invention is illustrated in the accompanying drawing, in which.

DETAILED DESCRIPTION OF THE INVENTION

Figure 2:
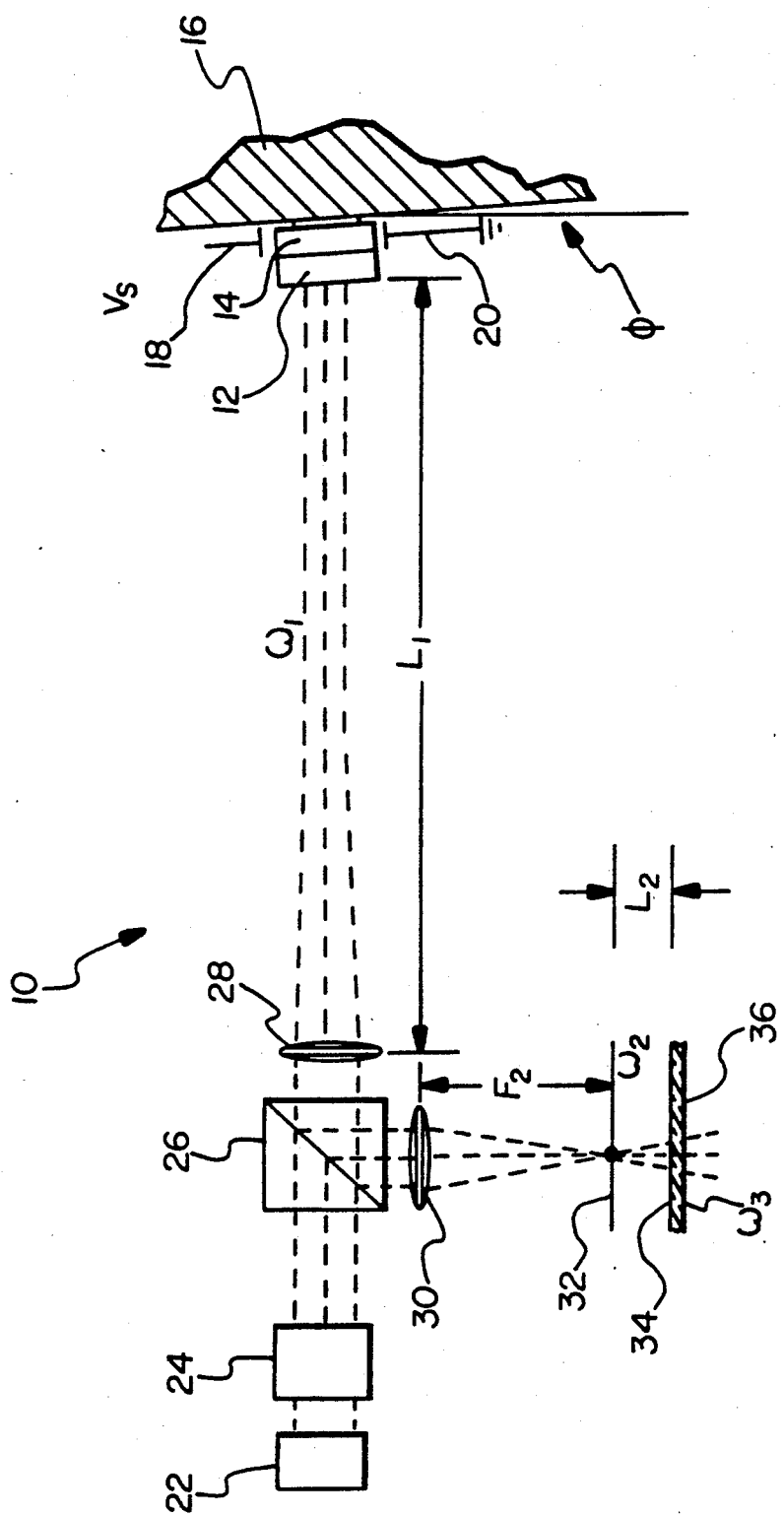
FIGS. 2-5 illustrate various aspects of an assembly and method of the invention.
Figure 3:
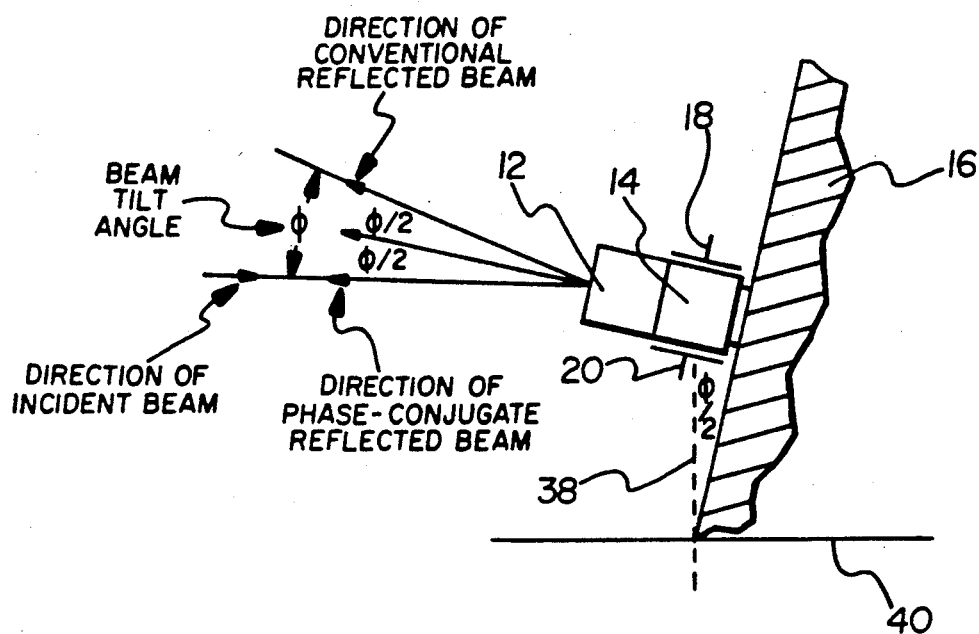
Figure 4:
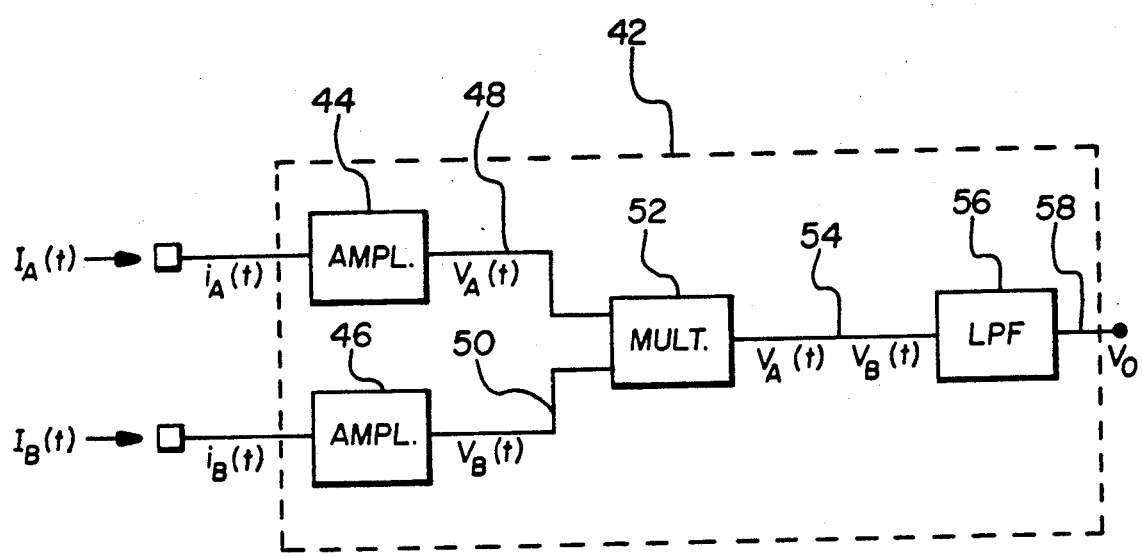

Attention is now directed to FIGS. 2-4 which illustrate various aspects of an assembly 10 of the invention. In particular, FIG. 2 shows that the assembly 10 comprises a conventional mirror 12 attached to a phase conjugate mirror 14. The phase conjugate mirror 14, in turn, is attached to a workpiece 16. The phase conjugate mirror 14 comprises a crystal of barium titanate ($BaTiO_3$). The crystal, by way of electrodes 18 and 20, is modulated with a drive voltage defined by a sawtooth waveform. The assembly further comprises a source of radiation 22 comprising a helium-neon laser operating at a wavelength of 6328 Angstroms. The source of radiation, i.e., the laser beam, is directed to the mirror 12 and phase conjugate mirror 14 by way of an optical isolator 24, conventional beam steering optics (not shown), a beam splitter cube 26, and a lens 28. Also, the lens 28 and the beam splitter cube 26 redirect radiation, by way of a lens 30, through a focal plane 32 to a far-field interferogram plane 34. A photo-diode array 36 is mounted coincident with the interferogram plane 34.

The operation of the assembly 10 is now disclosed. It is the objective of the assembly 10 to provide an indication of the alignment or tilt of the workpiece 16 with respect to a reference. FIG. 3 shows the workpiece 16 defining a tilt or an alignment angle $\phi/2$ with respect to a pair of reference axes 38, 40. The tilt $\phi/2$ causes a portion of the incident laser beam to be reflected by the mirror 12 at a reflection angle $\phi$ in accordance with Snell's Law, i.e., the angle of reflection (arbitrarily defined as being in a positive direction from the normal to the mirror's 12 surface) is equal to the angle of incidence, but in the negative direction to the normal. The phase conjugate mirror 14 also causes a portion of the incident laser beam to be reflected. Here, the reflection is responsive to phase conjugate mirror 14 comprising the nonlinear medium, i.e., the crystal of barium titanate. The incident laser beam, accordingly, is reflected by the phase conjugate mirror 14 along the incident path, and is therefore not affected by the tilt $\phi/2$.

Preferably, the energy of the radiation reflected by the conventional mirror 12 should be approximately equal to the energy of the radiation returned by the phase conjugate mirror 14, in order to maximize the interference fringe modulation at the interferogram plane 34. By way of example, the mirror 12 can be approximately 80 percent transmissive of radiation, and the phase conjugate mirror 14 have a reflectance of approximately 30 percent, so that the reflected radiation energy from the mirror 12, identified as E(CM)12, is equal to (1–0.8) times the incident radiation energy E, and the reflected radiation energy from the phase conjugate mirror 14 is approximately the same.

Continuing, it is noted that the mirror 12 and phase conjugate mirror 14 combination have transformed the incident laser beam into a pair of plane wave reflected beams, and that the angle $\phi$ between these two reflected beams is twice the tilt of the monitored workpiece 16. A key additional notation is that these two reflected beams are mutually coherent. This fact enables us to incorporate these two beams into the common path interferogram plane 34.

This accomplishment, that is, incorporating the two reflected beams into the common path interferogram plane 34, is effected by way of the reflected beams traversing the lens 28, the beamsplitter cube 26, and the lens 30, in that order. (See FIG. 2, and note that the optical isolator 24 functions to prevent the feedback of reflected radiation to the laser 22.) The two reflected beams combine and form a pattern of straight interference fringes at the far-field interferogram plane 34. The spatial frequency of these interferogram fringes is proportional to the tilt $\phi/2$ of the workpiece 16.

As disclosed above, the far-field interferogram plane 34 is coincident with the photo-diode array 36. The photo-diode array 36, accordingly, can respond to the interference fringes, and produce an electrical signal that corresponds to this response. As just noted, since the spatial frequency of these interference fringes is proportional to the tilt $\phi/2$ of the workpiece 16, the photo-diode array 36 output electrical signal can also be a measure of the tilt $\phi/2$ of the workpiece 16.

As explained in detail above in the Summary of the Invention, the tilt-detection sensitivity of the photo-diode array 36 (a preferred detector means) can depend on the distance $\Delta x$ between the interference fringes, and accordingly, on the tilt angle $\phi/2$. We concluded that a detector means (e.g., the photo-diode array 36) of a given spatial extent, may be dependent on the tilt angle $\phi/2$ being at least a certain maximum. At the same time, we disclosed that this diminution of sensitivity can be overcome, by applying an appropriate electrical signal to the second element (e.g., the phase conjugate mirror 14), thus generating the known phase shift in the radiation reflected at the second reflection angle. We now examine this solution in detail by way of four case studies.

First, assume that the tilt $\phi=0°$, and that the electrical signal $V_s=0$. Then, the interference fringe pattern is stationary. Each of the photo-diodes in the array 36 responds by outputting an electrical signal that is constant and substantially identical. The electrical signals are constant because $V_s=0$; they are substantially identical because the tilt $\phi=0°$.

Figure 1A:
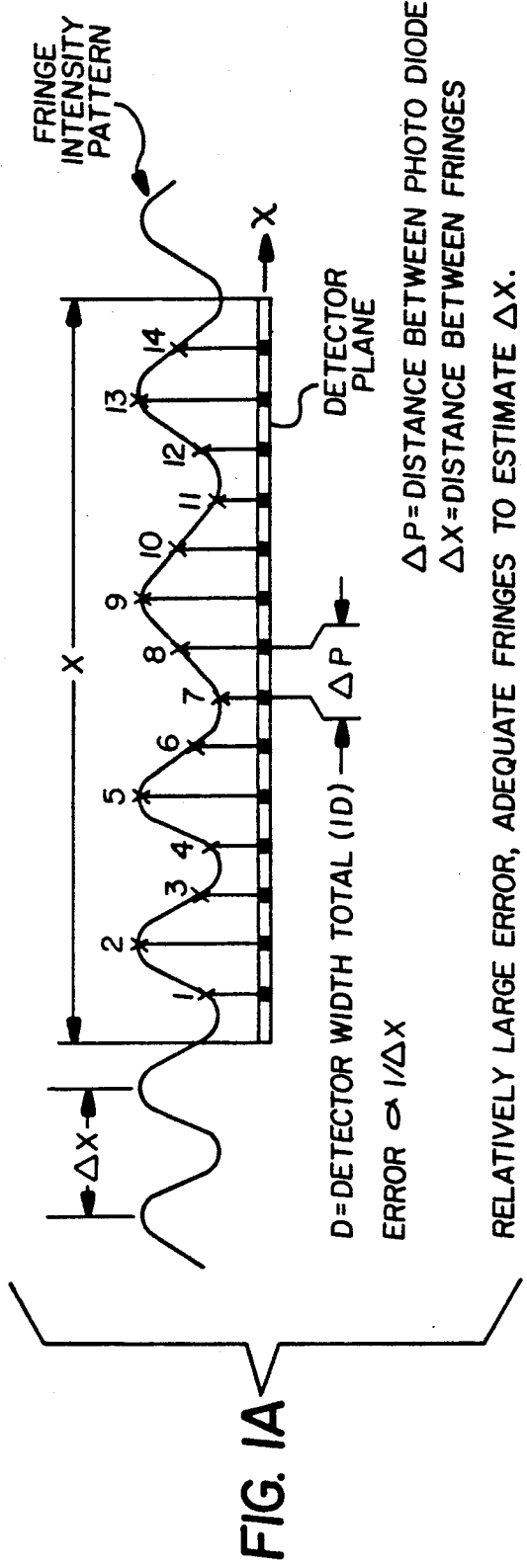
FIGS. 1A, B show waveforms that help explain advantages provided by the invention.

Now, second, assume that there is a tilt $\phi°$, and that the tilt $\phi°$ is within the sensitivity range of the photo-diode array 36. $V_s$ again is given by $V_s=0$. This is the situation described above with reference to FIG. 1A. For this second case, each of the photo-diodes in the array 36 outputs an electrical signal, each of which electrical signals is constant, but may be of different value, one from another. The electrical signals are constant because $V_s=0$; they may be different in value, e.g., intensity, because the tilt $\phi \neq 0°$.

Figure 1B:
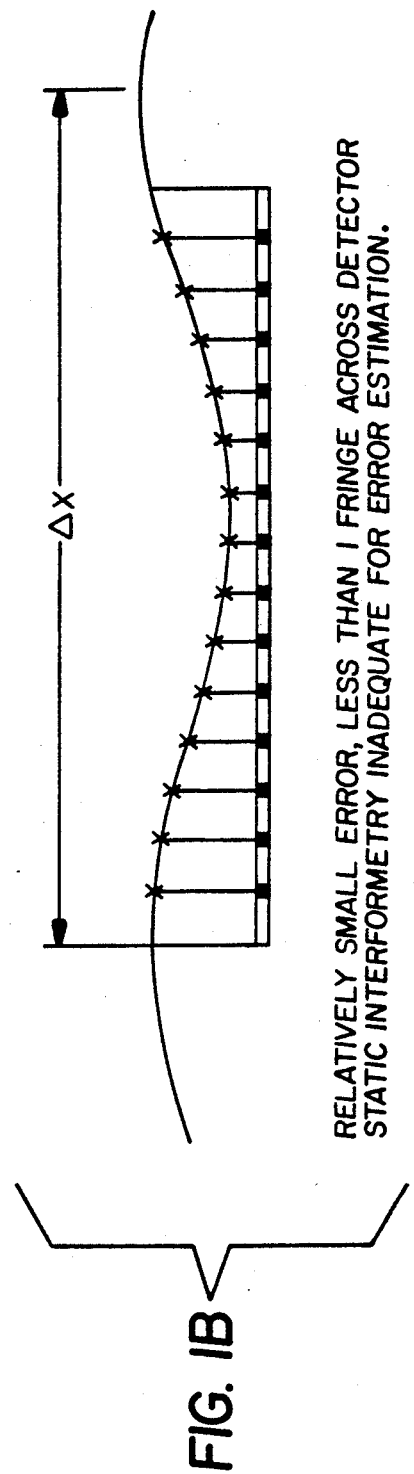

In the third case, assume that $V_s=0$, but that the tilt $\phi_{small}$ is sufficiently small, so that, within the fixed configuration of the photo-diode array 36, waveform peaks in the interference fringes cannot be ascertained. This is the situation described above with reference to FIG. 1B. The photo-diode array 36 responds by outputting electrical signals that may be ambiguous, and may not be a measure of the tilt $\phi_{small}$.

In the fourth case, we remedy the deficiencies of the third case, by applying an appropriate electrical signal $V_s$ to the phase conjugate mirror 14. This action introduces a phase shift, having a range of 0 to $2\pi$ radians, into the phase conjugate reflected beam relative to the radiation beam reflected by the mirror 12. If the electrical signal $V_s$ is sawtooth, then the phase conjugate mirror 14 reflects a cyclic phase conjugate reflected beam relative to the radiation beam reflected by the mirror 12. For both cases, this $V_s$ action, when viewed downstream at the interferogram plane 34, causes the interference fringe pattern to apparently move in a direction perpendicular to the fringes, and continuously across the far-field interferogram plane 34. Moreover, as the fringe pattern moves across each photo-diode in the photo-detector 36, the cyclic variation of intensity generates a sinusoidal signal in each of the photo-diodes. The signal frequency for each electrical signal outputted by each photo-diode is exactly the same, namely, the frequency f(t) of the signal $V_s$ applied to the plates 18, 20 of the phase conjugate mirror 14. However, the electrical signals from each of the photo-diodes (can) differ in phase, and this phase difference is proportional to the magnitude of the tilt $\phi_{small}$.

In this regard, note that the photo-detector array 36 preferably inputs into a phase detection circuit 42 shown in FIG. 4. The phase detection circuit 42 is employed to generate an output signal which is proportional to the phase difference between a first pair of photo-diodes. This output signal is proportional to the component of tilt lying parallel to a line that would join this first pair of photo-diodes. Additionally, a second set of photo-diodes, which lie in a direction orthogonal to the first pair of photo-diodes, is advantageously employed to generate a second output signal. These two orthogonal photo-diode output signals can be combined to provide both the magnitude and direction of tilt of the workpiece 16 from the reference.

The FIG. 4 phase detection circuit 42 comprises first and second amplifiers 44, 46 which amplifiers 44, 46 provide voltage signal outputs along a line pair 48, 50 to an electronic multiplier 52. The output of the electronic multiplier 52, in turn, is fed as an input along a line 54, to a low pass filter 56. The output of the low pass filter 46, on a line 58, corresponds to the output signal which is proportional to the phase difference between a pair of photo-diodes.

The operation of the FIG. 4 phase detection circuit 42 is as follows. The first and second amplifiers 44, 46 input irradiance signals $I_A(t)$ and $I_B(t)$ respectively, which signals are outputted by the photo-detector array 36. The signals $I_A(t)$ and $I_B(t)$ are amplified by the amplifiers 44, 46. The output of the amplifiers 44, 46 are voltage signals $V_A(t)$ and $V_B(t)$. The voltage signals, in turn, are multiplied by the electronic multiplier 52, thus producing the product $V_A(t) V_B(t)$. The product is operated on by the low pass filter 56, thus generating the output voltage signal $V_o$. The signal $V_o$ is proportional to the phase difference between a pair of photo-diodes.

We note that the mathematics that corresponds to the electronic functions of the phase detection circuit 42 is developed below. Further, the phase detection circuit 42 employs amplifiers, multipliers and filters, etc. Conventional components can be employed to this end.

The operation of the assembly 10 has now been set forth. The following disclosure is provided to enable one skilled in the art to fully realize the benefits of the present invention.

We begin by recalling that the operation of the assembly 10 shown in FIG. 2 includes directing the laser beam from the source 22 to the mirror 12 and phase conjugate mirror 14, by way of the optical isolator 24, conventional beam steering optics (not shown), the beam splitter cube 26, and the lens 28. The first point to be made is that it is desirable to locate or place the laser beam at the mirror 12 (and phase conjugate mirror 14), in an optimal manner. To do this, it is desirable that the laser beam, having a spectral wavelength $\lambda$, operate in its fundamental mode, where the intensity across its diameter has a Gaussian distribution. The optical elements in the assembly 10, accordingly, are preferably large enough so that they do not significantly truncate this Gaussian beam intensity profile. Restated, the optical elements in the assembly 10 are preferably designed to place the waist of the Gaussian beam at the location of the lens 28. The function of the lens 28, in turn, is to refocus the beam so that a beam waist occurs at the mirror 12 - phase conjugate mirror 14 location. To accomplish this, the lens 28 preferably has a focal length $F_1$ in accordance with Equation (1):

$$F_1 = \frac{2 L_1}{1 \pm \sqrt{1 - \left(\frac{2 \lambda L_1}{\pi \cdot \omega_1^2}\right)^2}} \tag{1}$$

where,
$L_1$ = is the distance from lens 28 to the mirror 12-phase conjugate mirror 14;
== laser spectral wavelength; and
$\omega_1$ = the desired radius of the beam waist at the lens 28.

It can be shown that minimum tilt ($\phi_{small}$) detection sensitivity is inversely proportional to $\omega_1$, so it is desirable to make this beam waist radius $\omega_1$ as large as is practical.

The corresponding beam waist radius $\omega_0$ at the mirror 12-phase conjugate mirror 14 location can be determined by equation (2):

$$\omega_0 = \frac{\lambda F_1}{\pi \omega_1} \cdot \left[ \frac{1}{1 + \left(\frac{\lambda F_1}{\pi \omega_1^2}\right)^2} \right]^{\frac{1}{2}} \quad (2)$$

We make two observations on equations (1) and (2). First, the square root term leads to two possible solutions. One solution corresponds to providing a focused beam at the mirror 12-phase conjugate mirror 14 location; the second solution corresponds to providing a collimated beam at the mirror 12-phase conjugate mirror 14 location. The preferred solution depends on a particular assembly 10 that it is desired to construct. The second observation on equation (1) and (2) is the caveat that if one does not place the beam waist at the mirror 12 location, the two reflected beams may have different curvatures. This difference in curvature, in turn, may produce, downstream, a contribution to the interference fringe pattern not related to the tilt of the workpiece 16.

In the same spirit that describes locating the laser beam at the mirror 12-phase conjugate mirror 14 in an optimal manner, we now turn our attention to locating the radiation from the mirror 12-phase conjugate mirror 14, for ultimate and optimal disposition downstream at the lens 30, the focal plane 32, and the interferogram plane 34.

We first assume that, since the lens 28, the beamsplitter cube 26, and the lens 30 are very close to each other, the light between them is essentially collimated. Thus, to a very good approximation, the beam waists of radius $\omega_1$ are also located at the lens 30. The function of the lens 30, in turn, is to refocus the two reflected beams onto the focal plane 32. Let the focal length of the lens 30 be $F_2$. Then, the required beam waist radius $\omega_2$ may be determined from equation (3) (similar to equation 2) viz.:

$$\omega_2 = \frac{\lambda F_2}{\pi \omega_1} \left[ \frac{1}{1 + \left(\frac{\lambda_2 F_2}{\pi \omega_1^2}\right)^2} \right]^{\frac{1}{2}} \quad (3)$$

It is preferred that $F_2$ be relatively short, so that:

$$\left(\frac{\lambda F_2}{\pi \omega_1^2}\right)^2 << 1 \quad (4)$$

Then, $\omega_2 \approx \frac{\lambda F_2}{\pi \omega_1} \quad (5)$

Due to the tilt angle $\phi$, the centroids of the two reflected beam waists are laterally separated on the focal plane 32 by a distance d, where $$d = F_2 \phi. \quad (6)$$

Beyond the focal plane 32, each reflected beam diverges as it propagates a distance $L_2$ to the interferogram plane 34. After propagating the distance $L_2$, the new beam waist radius is $\omega_3 = \lambda L_2 / \pi \omega_2$. At the interferogram plane 34, the two reflected beams are superimposed, and in the region of beam overlap, the interference fringes are formed.

The interference fringes form patterns which can be calculated from the theory of Fraunhofer diffraction by N identical apertures. (See, for example, the reference "Radiation and Optics", Stone, McGraw-Hill, 1963, Chapter 7). For the case of the assembly 10, in particular, the two reflected beams correspond to two illuminated apertures, or two focused spots of light, at the focal plane 32. The textbook diffraction approximations are valid if the angular subtense enclosing the two apertures, as seen from the interferogram plane 34, is very small. This condition for far field diffraction is met when:

$$(2\omega_2 + d) << L_2 \quad (7),$$

where $L_2$ is the distance between the focal plane 32 and the interferogram plane 34.

From Stone, we find that the interference fringes form an irradiance pattern I at the interferogram plane 34, given by equation (8):

$$I = I_1 |F|^2 \quad (8)$$

where,
- $I_1$ = the irradiance pattern that is obtained for just one aperture, i.e., one aperture open and the other aperture blocked; and
- $|F|^2$ = the fringe pattern caused by optical interference between the two reflected beams.

We now identify a quantity s as distance on the interferogram plane 34. Following the familiar derivation given in Stone, we can further expand equation (8) to the following equation (9):

$$I = \quad (9)$$

$$\frac{1}{2}\left[1 + \cos\left(\frac{2\pi}{\lambda} \frac{F_2 \phi s}{L_2} + \beta\right)\exp\left[-2\left(\frac{F_2 s}{\omega_1 L_2}\right)^2\right]\right]$$

where $\beta$ = phase shift; and the other variables have already been defined.

The present invention controls the phase shift $\beta$ by means of the sawtooth electrical signal applied to the second element means. This action means that $\beta$, in equation (9), is replaced by the function $\beta(t) = 2\pi \omega f_s t$, where $f_s$ is the frequency of the applied electrical signal. This action, in turn, obliges us to modify equation (9), to produce equation (10):

$$I(t) = \quad (10)$$

$$\frac{1}{2}\left[1 + \cos\left(\frac{2\pi}{\lambda} \frac{F_2 \phi s}{L_2} + 2\pi f_s t\right)\exp\left[-2\left(\frac{F_2 s}{L_2 \omega_1}\right)^2\right]\right]$$

Note that equation (10) applies to one cycle of the sawtooth waveform. Equation (10) defines the irradiance pattern at the interferogram plane 34 as a time dependent function. Equation (10) is also the irradiance signal $I_A(t)$ and $I_B(t)$ inputted to the FIG. 4 phase detection circuit 42 above. At a particular instant of time, $t_x$, the argument of equation (10), i.e., the phase angle $\theta$, is equal to:

$$\theta = \frac{2\pi F_2 \phi S}{\lambda L_2} + 2\pi f_s t_x \quad (11)$$

Figure 5:
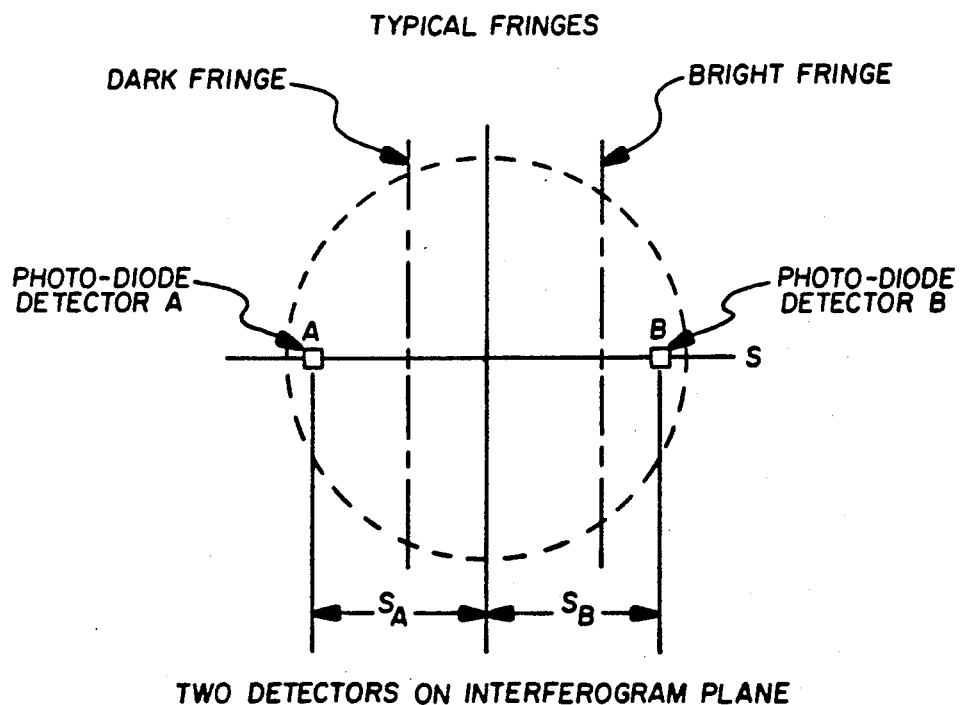

Equation (11) may be understood, in terms of the assembly 10 of the present invention, by referring to FIG. 5. FIG. 5 shows a photo-diode A and a photo-diode B, coincident with the interferogram plane 34, and separated by the distances $S_A$ and $S_B$. The photo-diodes A and B, as disclosed above, provide output electrical signals. In particular, following equation (11), the electrical signal at the photo-diode A will have the following values of phase $\theta_A$ at the time $t_x$:

$$\theta_A = \frac{2\pi F_2 \phi S_a}{\lambda L_2} + 2\pi f_s t_x \quad (12)$$

Similarly, the electrical signal at the photo-diode B will have the following values of phase $\theta_B$ at the time $t_x$:

$$\theta_B = \frac{2\pi F_2 \phi S_b}{\lambda L_2} + 2\pi f_s t_x \quad (13)$$

As also disclosed above, the electrical signals from each of the photo-diodes (can) differ in phase, and this phase difference is proportional to the magnitude of the tilt $\phi$ of the workpiece 16 from the reference. This last statement can be expressed as equation (13) minus equation (12):

$$\Delta\theta = \theta_B - \theta_A = \frac{2\pi F_2 \phi}{\lambda L_2}(S_B - S_A) \quad (14)$$

Thus, equation (14) expresses the fact that the phase difference is proportional to the tilt $\phi$. The phase difference $\Delta\theta$ is measured by way of the phase detection circuit 42, so that it is a known quantity. The detector separation $\Delta S = (S_B - S_A)$ is also measured and known. Accordingly, the tilt $\phi$ can be calculated by the following equation (15):

$$\phi = \lambda L_2 \frac{(\Delta\theta/2\pi)}{F_2 \Delta s} \quad (15)$$

Equation (15) mathematically demonstrates that the sought for enhanced sensitivity of the assembly 10 to a small tilt angle $\phi$, and for a given $\Delta s$, can be realized by generating the known phase shift $\Delta\theta$ in the radiation reflected by the second element means.

What is claimed is:

1. A method utilizing radiation for monitoring the alignment of a workpiece, comprising the steps of:
   (a) positioning an assembly for monitoring the alignment of the workpiece, the assembly comprising:
      (i) first element means for reflecting at least a portion of radiation incident thereupon at a first incident angle, said first element means capable of reflecting the radiation at a first reflection angle different from said first incident angle when the incident angle is not substantially normal to the reflection angle;
      (ii) second element means for reflecting at least a portion of radiation incident thereupon at a second incident angle, said second element means reflecting the radiation at a second reflection angle substantially equal to said second incident angle;
      (iii) means for applying an electrical signal selected from the group consisting of a sinusoidal signal and a sawtooth signal, to the second element means for generating a known phase shift in the radiation reflected at the second reflection angle; and
      (iv) detector means for receiving the radiation reflected from said first element means and the radiation reflected from said second element means;
   (b) generating radiation for uitlization by the assembly as defined; and
   (c) generating the known phase shift in the radiation reflected at the second reflection angle, for producing in the detector means at least one signal indicative of the alignment of the workpiece with respect to a reference.

2. A method as set forth in claim 1, wherein the first element means and the second element means comprise a single structure that provides both functions of the first and second element means.

3. A method as set forth in claim 1, wherein the detector means comprises a photo-diode array, which array generates an output signal which is in correspondence to the magnitude of tilt of the workpiece with respect to the reference.

* * * * *

UNITED STATES PATENT AND TRADEMARK OFFICE
CERTIFICATE OF CORRECTION

PATENT NO.  : 5,017,011
DATED       : May 21, 1991
INVENTOR(S) : Jerold B. Lisson et al.

It is certified that error appears in the above-identified patent and that said Letters Patent is hereby corrected as shown below:

| | |
|---|---|
| Title Page | Underneath "Assistant Examiner--Matthew W. Koren" insert --Attorney, Agent, or Firm--Stephen C. Kaufman--; |
| Abstract, line 5 | Delete "Advantage" and substitute therefor --Advantages--; |
| Col. 3, line 42 | after "or," add --a--; |
| Col. 7, line 66 | Delete "46" and substitute therefor --56--; |
| Col. 8, line 58 | Delete "=" (first occurrence) and substitute therefor --$\lambda$--; |
| Col. 10, line 6 | Delete "relected" and substitute therefor --reflected--. |

Signed and Sealed this

Twentieth Day of October, 1992

Attest:

DOUGLAS B. COMER

Attesting Officer     Acting Commissioner of Patents and Trademarks